March 13, 1934.  F. J. KRAMER  1,951,284
HEEL PROTECTING FOOT REST
Original Filed April 14, 1932
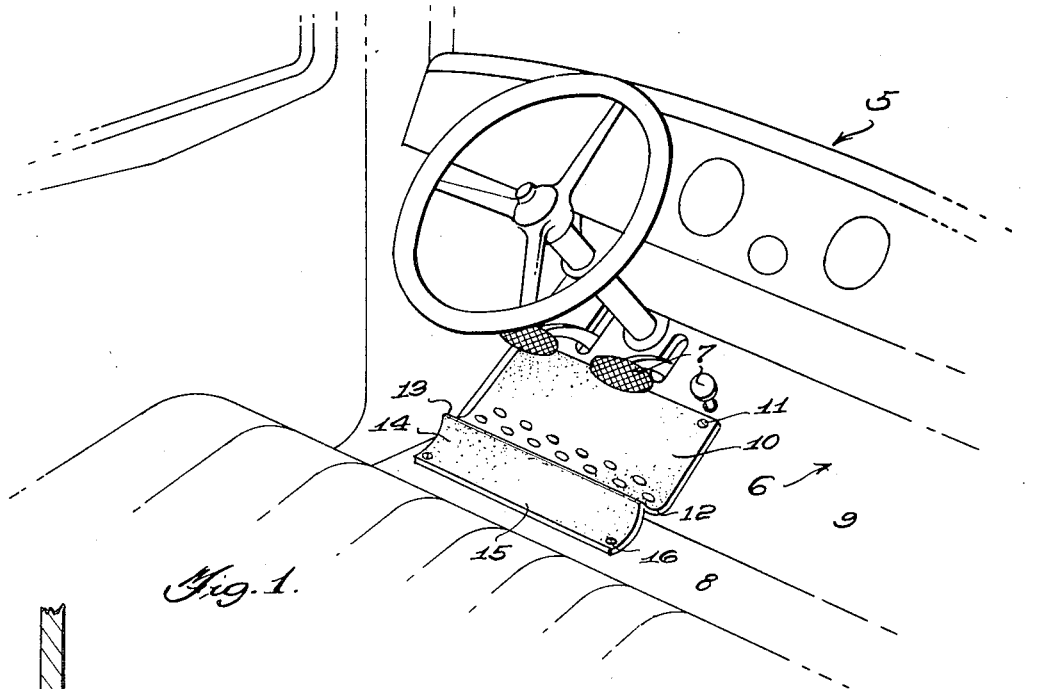
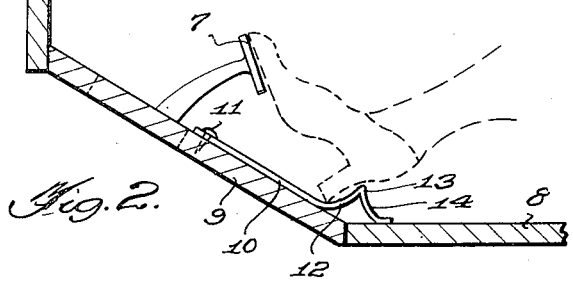
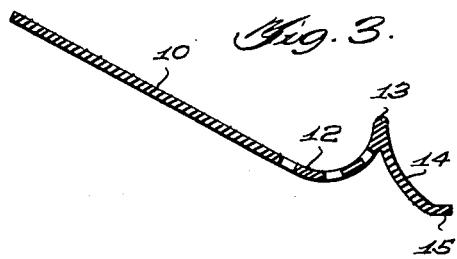
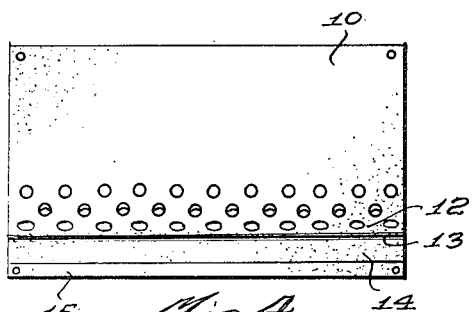
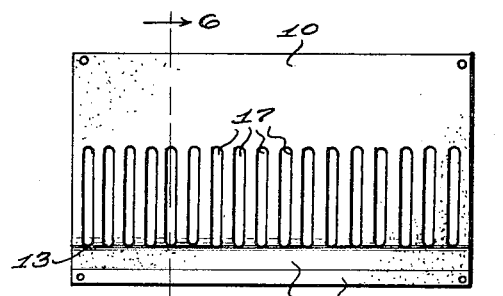
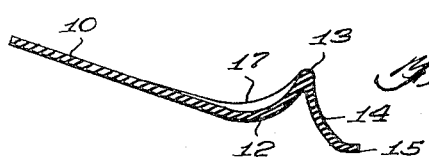
Inventor
FRANK J. KRAMER
By James N. Cyples.
HIS Attorney Patented Mar. 13, 1934

1,951,284

UNITED STATES PATENT OFFICE 1,951,284

HEEL PROTECTING FOOT REST

Frank J. Kramer, Lancaster, Pa.

Application April 14, 1932, Serial No. 605,312
Renewed August 15, 1933

6 Claims. (Cl. 74—81)

This invention relates to an improvement in heel supports for the drivers of automobiles and has for its object to provide such a support that will protect the shoe against injury resulting in the operation of the conventional control pedals.

The invention contemplates the provision of a protecting heel support that may be quickly and easily attached to the floor boards of the automobile directly in front of the operating pedals and is of such length as to extend entirely across the area of all the pedals so as to form a support for either foot of the operator when using the clutch or brake pedal or when using the accelerator pedal.

It is an object of the invention to provide such a support that is formed of a flexible material, such a sponge rubber or the like, that will not injure the heel of the shoe when resting thereagainst, but so constructed as to provide a firm rest for the heel.

A further and very important object of the invention resides in the extreme simplicity of the device, resulting in a low cost of manufacture, is strong, durable and highly convenient in use.

Other important objects and advantages of the invention will be apparent during the course of the following description, reference being had to the accompanying drawing wherein like numerals designate like parts throughout.

In the drawing,

Figure 1 is a perspective view of the driving compartment of an automobile showing the invention in use, Figure 2 is a section view through the floor boards with the device in position, Figure 3 is a slightly enlarged section of the device, Figure 4 is a plan view thereof, Figure 5 is a similar view of a slightly modified form of the invention, and, Figure 6 is a section taken on line 6—6 of Figure 5.

Referring specifically to the drawing, the numeral 5 designates an automobile of conventional construction, having floor boards 6 and operating pedals 7. As is customary, the floor boards comprise a horizontal section 8 and an inclined section 9. The pedals 7 as usual operate through slots that are located adjacent the upper edge of the inclined board 9 with their lower ends terminating a substantial distance from the joint between the boards.

The foot rest is designated as a whole by the numeral 10, and comprises an elongated flat sheet of flexible material such as sponge rubber, the flat sheet comprising the major part of the material. As clearly shown, the sheet 10 is secured to the inclined board 9 by screws 11, in such position that the sheet will lie entirely across an area sufficient to include all the operating pedals 7, thereby insuring a heel rest at any position of the driver's feet.

As clearly shown in Figures 2 and 3, the material of the sheet is given a substantially abrupt curve upwardly as at 12, and terminates in a ridge 13. The material is then turned downwardly upon a curve, as at 14, and then outwardly into a horizontal portion 15. The down turned portion 14 provides a supporting leg for the inverted V-shaped ridge formed by the portions 12, 13 and 14, and this ridge provides a heel engaging portion that extends throughout the length of the support. Since it is intended that the device shall be molded, the bend at 13 is thickened for providing rigidity and insure of the device maintaining its shape. If found desirable, the horizontal portion may be secured to the floor board 8 by screws 16, although this is not essential.

It is desirable that means be provided to carry off the dirt that is scraped from the heel of the operator, and to accomplish this the material is comparatively closely perforated over an area adjacent to the ridge 13. Thus, when the dirt is scraped off the heel, it will pass through these perforations to the floor board. In cleaning the car, it only becomes necessary to lift the edge of the device upwardly and sweep thereunder. The upward movement is readily permitted due to the flexibility of the device.

The structure illustrated in Figures 5 and 6 is identical with the first form, with one exception, and that is the perforations are omitted and corrugations 17 substituted therefor. Thus instead of the dirt passing through the sheet, it will be collected in the troughs formed by the corrugations. In both cases, the dirt will be carried away from the shoe to thereby avoid the grinding effect it might have as the heel is rubbed against the rest.

In use the device will insure of a relatively soft surface for the heel, thereby avoiding the possibility of injury to the leather as is the case with rests now in use. Further, the device insures of a support at any position of the driver's feet and it becomes unnecessary for him to feel around with the foot in order to place the heel thereon. Heel rests heretofore have been confined to one pedal, namely, the accelerator, while the device of the present invention provides one rest that is common to all the pedals, and is universal in use, it not being restricted to any one make of automobile.

It is to be understood that the invention is not limited to the precise shape shown, but that it includes within its purview whatever changes fairly come within either the terms or the spirit of the appended claims.

Having described the invention, what I claim is:—

1. A device of the character described adapted to be secured to the inclined floor board of an automobile, comprising a sheet of rubber or like flexible material having its free edge formed into a substantially inverted V-shape.

2. A device of the character described comprising a sheet of rubber or like flexible material adapted to have one of its edges secured to the floor board of an automobile, the free edge of said sheet terminating in a substantially inverted V-shape extending entirely across said sheet.

3. A support of the character described formed of a single piece of rubber or like flexible material adapted to be positioned upon the floor board of an automobile with one of its edges secured to said board, said support being of such size as to extend entirely across the area of the operating pedals of the automobile, said support having its free edge terminating in an upstanding inverted V-shaped heel support extending throughout its length, the free edge of the V serving as a supporting leg for the heel rest.

4. A foot rest of the character described formed from a single sheet of rubber or like flexible material and adapted to have one of its edges secured to the inclined floor board of an automobile, the opposite edge terminating in an inverted V-shaped heel supporting ridge, said sheet having perforations formed over its surface adjacent the said ridge.

5. A foot rest of the character described formed of a single sheet of rubber or like flexible material, said sheet having one of its edges terminating in an upstanding inverted V-shaped ridge, the material adjacent the apex of said ridge formed relatively thick for providing rigidity to said ridge, said ridge extending throughout the length of said sheet, said sheet having perforations formed therethrough adjacent the ridge and extending throughout the length of the sheet.

6. A foot rest of the character described formed from a sheet of flexible material having one of its edges terminating in an inverted V-shaped ridge extending throughout the length of the sheet, the upper surface of said sheet provided with a plurality of closely arranged transversely extending ribs terminating adjacent the apex of said ridge.

FRANK J. KRAMER.